United States Patent
Wang et al.

(10) Patent No.: US 6,838,536 B2
(45) Date of Patent: Jan. 4, 2005

(54) REACTIVE AND GEL-FREE COMPOSITIONS FOR MAKING HYBRID COMPOSITES

(75) Inventors: Zhikai Wang, Roswell, GA (US); Carol Black, Smyrna, GA (US); Jun Qiao, Smyrna, GA (US)

(73) Assignee: UCB, S.A., Brussels (BE)

( * ) Notice: Subject to any disclaimer, the term of this patent is extended or adjusted under 35 U.S.C. 154(b) by 114 days.

(21) Appl. No.: 10/231,137

(22) Filed: Aug. 30, 2002

(65) Prior Publication Data

US 2004/0044095 A1 Mar. 4, 2004

(51) Int. Cl.$^7$ ............................. C08K 3/36; C08K 3/10; C08F 2/46
(52) U.S. Cl. .................... 526/240; 526/241; 528/26; 528/395; 522/77; 522/81; 522/83; 522/84; 522/96; 522/103; 522/107; 522/113; 522/114; 524/806; 524/807; 524/832
(58) Field of Search .................. 522/77, 81, 83, 522/96, 103, 107, 114; 526/240, 241; 528/395

(56) References Cited

U.S. PATENT DOCUMENTS

| | | | |
|---|---|---|---|
| 3,856,643 A | * 12/1974 | Nakamoto et al. | 522/96 |
| 4,455,205 A | 6/1984 | Olson et al. | |
| 4,478,876 A | 10/1984 | Chung | |
| 4,486,489 A | * 12/1984 | George | 428/220 |
| 4,487,712 A | * 12/1984 | Wilson et al. | 252/78.3 |
| 4,491,508 A | 1/1985 | Olson et al. | |
| 4,624,971 A | 11/1986 | van Tao et al. | |
| 4,983,671 A | * 1/1991 | Numata et al. | 525/63 |
| 5,120,811 A | 6/1992 | Glotfelter et al. | |
| 5,316,855 A | 5/1994 | Wang et al. | |
| 5,425,997 A | * 6/1995 | Costin et al. | 428/482 |
| 5,548,051 A | 8/1996 | Michalczyk et al. | |
| 5,648,441 A | 7/1997 | Keller et al. | |
| 5,662,886 A | * 9/1997 | Oxman et al. | 424/49 |
| 5,717,004 A | 2/1998 | Hashimoto | |
| 5,817,715 A | * 10/1998 | Medford | 524/789 |
| 6,001,163 A | 12/1999 | Havey et al. | |
| 6,071,990 A | 6/2000 | Yip et al. | |
| 6,160,067 A | 12/2000 | Eriyama et al. | |
| 6,303,704 B1 | * 10/2001 | Nesbitt | 525/333.8 |
| 6,426,034 B1 | * 7/2002 | McComas et al. | 264/494 |

FOREIGN PATENT DOCUMENTS

| | | |
|---|---|---|
| DE | 32 01 153 A | 7/1983 |
| DE | 199 23 118 | 11/2000 |
| EP | 0 666 290 A | 8/1995 |
| EP | 0 736 488 | 7/2000 |
| EP | 1 016 625 | 7/2000 |
| FR | 1 505 256 | 12/1967 |
| WO | 91/18933 | 12/1991 |
| WO | 93/10159 | 5/1993 |
| WO | 00/29496 | 5/2000 |

OTHER PUBLICATIONS

C. Chan et al., Macromolecular Chemistry and Physics, vol. 202, No. 6, pp. 911–916 (2001).

G. Brinker et al., "Sol–Gel Science, The Physics and Chemistry of Sol–Gel Processing", pp. 620–628 (1990), Academic Press.

* cited by examiner

*Primary Examiner*—Susan Berman
(74) *Attorney, Agent, or Firm*—Wenderoth, Lind & Ponack, L.L.P.

(57) ABSTRACT

A substantially reactive and gel-free composition which comprises:

a. particles capable of reaction with a radiation curable resin;
b. a coupling agent for modification of the surface of said particles;
c. a radiation curable resin;
d. a radiation curable salt capable of inhibiting gel formation in said composition.

Upon radiation cure of the composition, composites with excellent mechanical properties are obtained

17 Claims, No Drawings

REACTIVE AND GEL-FREE COMPOSITIONS FOR MAKING HYBRID COMPOSITES

BACKGROUND OF THE INVENTION

1. Field of the Invention

The present invention relates to a substantially reactive and gel-free composition for making hybrid composites.

2. Prior Art Related to the Invention

In the 1990s, sol-gel chemistry has been used extensively to produce organic-inorganic composites. A number of patents and published articles have reported a variety of synthetic routes by using this chemistry and technology for preparation of hybrid composites. In general, these sol-gel derived hybrid composites can be divided into two basic classes: those where particles are formed in situ or those where particles are directly employed as starting materials.

In the first class of hybrid composites, organosilanes and/or other metal alkoxides are employed not only as particle-precursors but also as network-formers. Very often, the mixtures of several types of precursors are used. In the presence of water, solvent (i.e. alcohol), and also catalysts (acid or base), simultaneous hydrolysis and condensation of these organosilanes and/or other metal alkoxides take place to form inorganic sols mixed with inorganic/organic networks, therefore, hybrid composites.

Usually, in order to obtain better processability, hybrids with highly organic characteristics are desired. To achieve this, more organic components, such as monomers, oligomers or polymers, are incorporated into the precursor solution first, and then hydrolysis, condensation and polymerization/cross-linking reactions are carried out.

As a representative example, U.S. Pat. No. 6,001,163 demonstrated the compositions and method to make this class of composite. An epoxy functional silane is used to provide polymerizable functional groups, and thus is an organic network former; TEOS (tetraethoxysilane) is used as a precursor for both particles and inorganic networks. Multifunctional carboxylic acids (anhydrides) or their combination are used as catalysts. The hybrid materials produced show good abrasion resistance. In U.S. Pat. No. 5,316,855, the organic/inorganic hybrid composites are prepared by co-condensing metal alkoxide sols (e.g. aluminum, titanium, or zirconium alkoxide sols) with one or more bis (trialkoxysilane-containing) organic components. The new hybrid composites show optical clarity and improved abrasion resistance. A number of patents, such as U.S. Pat. No. 6,071,990, 5,120,811, 5,548,051, WO 00/29496, EP 1,016,625, etc., are all believed to belong to this class.

In general, neither hydrolysis nor condensation reactions can be completed unless a high temperature process is applied. As a result, unreacted hydroxyl and alkoxyl groups remain in the produced materials, as illustrated in U.S. Pat. No. 5,316,855. Therefore, both hydrolysis and condensation of these reactive groups are expected to continue for a long time until a dynamic equilibrium is reached.

In the second class, such as in U.S. Pat. No. 4,455,205, 4,478,876, 4,491,508, 6,160,067, and EP 0,736,488, etc., pyrogenic or precipitated particles (e.g. $SiO_2$, $Al_2O_3$) are used as starting media. The particles are first dispersed into organic media, usually hydrophilic solvents, such as alcohols. Then organo-functional silane(s) with necessary water and catalysts are added. The grafting reactions take place on the surface of the particles. Finally, the surface modified particles are mixed into the polymeric matrix or reactive monomers/oligomers to form organic-inorganic hybrid composites after polymerization/cross-linking.

A typical example demonstrated in U.S. Pat. No. 4,624,971 (Battelle), an abrasion resistant UV curable composition for coating substrates was produced. In the first step, pyrogenic silica or alumina particles having a particle size of less than 100 nm are dispersed into organic solvents. Then, by mixing hydrolyzed trialkoxysilanes with the particle dispersions, methacryloxypropyl, or glycidoxypropyl, or epoxycyclohexyl reactive groups are chemically bonded on the surface of the particles. Here, hydrolyzed trialkoxysilanes serve as both surface-modifying agents and inorganic network formers. The amount of these silanes is usually greater than 20% in the total composition weight.

In general, often only one of three, sometimes two of three silanol groups of hydrolyzed trialkoxysilanes is/are bonded on the surface of the particles. This bonding limitation is the result of both the limited reactivity and the steric effect of the silanols. In this regard, see Brinker et al., "Sol-Gel Science, The Physics and Chemistry of Sol-Gel Processing", pp. 236—269, 1990 (Academic Press, Inc.). Again, unhydrolyzed alkoxyl and uncondensed free hydroxyl groups can cause the same problems described previously. Moreover, agglomeration of functionalized particles can also take place through the formation of Si—O—Si and/or hydrogen bonds located on the surface of particles.

For a low concentration, solvent-based application, this should not be a big issue because the solvent dilution keeps particles separated, and thus limits the formation of either large particles or networks.

In order to satisfy increasingly rigorous environmental regulations and meet high performance requirements, it is often desirable to use substantially reactive materials, such as radiation curable materials, or at least, low solvent-containing materials. Therefore, it is necessary to produce a stripped material by removing both water and solvent (alcohol) azeotropically. In contrast to the case of solvent-dilution, the remaining alkoxyl and silanol groups have a much higher probability of contacting each other during the concentration operation. As a result, these slow hydrolysis and condensation reactions cause a gradual extension of inorganic networks through siloxane, Si—O—Si, bonds and/or hydrogen bonds. Consequently, unstable viscosity, large particle formation and even gel formation occur. This is a significantly troubling issue for all practical large-scale productions.

It is well known that in the case of free radical radiation curable acrylates and methacrylates, removing oxygen inhibition during the solvent-stripping operation can also cause the gelation. However, this gelation is essentially different from one caused by the silanol condensation reactions. The former one is the result of free radical polymerization of acrylates or methacrylates. Either air sparging or the addition of extra free radical inhibitor can prevent this gelation.

U.S. Pat. No. 5,103,032 relates to compositions containing an acrylsilane or methacryloxysilane and an N,N-diakylaminomethylene phenol in an amount at least sufficient to inhibit polymerization of the silane during its formation, purification and storage.

U.S. Pat. No. 5,817,715 relates to a gel-free silica acrylate UV curable coating composition. This coating material is composed of one or more of soluble salts, soaps, amines, nonionic and anionic surfactants, etc., and a similar sol-gel composition described in U.S. Pat. No. 4,624,971. No radiation curable salts are mentioned. In addition, the water-soluble additives that are mentioned may cause more hydrolytic stability problems.

In view of the foregoing, an objective of the invention is to provide compositions for hybrid composite materials, which compositions are solvent free or with a very low-level of solvent, unlike traditional compositions for hybrid composite materials, which are prepared via a sol-gel process.

Another objective of the invention is to provide compositions for hybrid composite materials with better Theological behavior, therefore, better processability than that of traditional compositions for hybrid composite materials prepared via sol-gel process.

Another objective of the invention is to provide compositions for hybrid composite materials, which compositions have stable viscosity, therefore, better processability, than that of traditional compositions for hybrid composite materials, which compositions are prepared via a sol-gel process.

Another objective of the invention is to provide compositions for hybrid composite materials that are radiation (UV/electron beam) curable.

Another objective of the invention is to provide hybrid composite materials that form cured coatings/films with better surface hardness than those formed solely from base-resins.

Another objective of the invention is to provide hybrid composite materials that form cured coatings/films with better surface scratch resistance than those formed solely from base-resins.

Another objective of the invention is to provide hybrid composite materials that form cured coatings/films with better abrasion resistance than those formed solely from base-resins.

Another objective of the invention is to provide hybrid composite materials that form cured coatings/films with better solvent/chemical resistance than those formed solely from base-resins.

Another objective of the invention is to provide hybrid composite materials that form cured coatings/films with higher impact resistance than those formed solely from base-resins.

Another objective of the invention is to provide hybrid composite materials that form cured coatings/films with higher storage modulus than those formed solely from base-resins.

Another objective of the invention is to provide hybrid composite materials that form cured coatings/films with higher loss modulus that those formed solely from base-resins.

Another objective of the invention is to provide hybrid composite materials that form cured coatings/films with higher Tg (glass transition temperature) than those formed solely from base-resins.

Another objective of the invention is to provide hybrid composite materials than form cured coatings/films with better weatherability than those formed solely from base-resins.

SUMMARY OF THE INVENTION

These and other objectives are realized by the present invention which relates to substantially reactive and substantially gel-free compositions, more particularly, radiation curable compositions.

Here, the term "gel-free" refers to compositions in which viscosity is controlled within useful limits. Additionally, no unwanted large particles are produced, unlike those frequently seen in the sol-gel process.

DETAILED DESCRIPTION

In the present invention, a very small amount (<1.0%) by weight of the total composition of radiation curable ionic compounds, e.g. metal (meth)acrylate compounds, such as calcium di(meth)acrylate, magnesium di(meth)acrylate, zinc di(meth)acrylate, aluminum tri(meth)acrylate, etc., is used as an inhibitor of the gelation of silanols. According to double charge layer theory, a small number of introduced cations, such as $Ca^{2+}$, will be attracted by anions, or induced dipoles, such as silanol molecules or sols (with attached OH on surface). This interaction creates a charged surface, or increases the surface potential. Consequently, the repulsion resulting from the same charged molecules/particle (sols) stabilizes the suspension of sols. Therefore, the condensation reactions are retarded until the reactions are needed in the cure process.

In the present invention, addition of a weak acid salt, such as calcium (meth)acrylate, incorporated with the same or nearly the same number of equivalents of acid (HCl or acrylic acid) makes a good buffer solution for the sol-gel system.

The pH value is one of the most important factors for the sol-gel process. From initial hydrolysis to late condensation, the process involves a large range of volume changes (solvent dilution and solvent evaporation). These volume changes cause significant pH variations that very often cause gelation or large particle formation. In this regard, see Brinker et al., above. The use of the buffer solution significantly reduces these risks.

The ionic compounds employed in the present invention are UV-reactive; thus they ((meth)acrylate anions) are co-polymerized with organic media (UV-resins) during the late UV-cure process. No additional contamination is added because of this employment of the ionic compounds.

In the surface modification reactions, organic zirconate (or titanate, or aluminate) compounds and/or mono- or multifunctional silanes are employed as coupling agents. The coupling agents anchored on the surface of the particles are designed to play two important roles in the performance improvements of the composite.

The first one is as a molecular bridge at the interface between two dissimilar phases to increase the compatibility of the two, such as inorganic/organic immiscible phases.

The second is as a desired functionality provider to render some desired properties for the final application.

Depending upon the surface structure of the particles and upon the type of the coupling agents employed, the coupling mechanisms fall into one or more of the following categories: surface chelation, coordination, ligand exchange, alcoholysis (condensation), chemical adsorption, and physical adsorption.

In the Examples which follow, the following materials were employed:
1. MA-ST-S, silica dispersion in methanol with average primary particle size of 8–10 nm was obtained from Nissan Chemical Industries, Ltd.
2. MEK-ST, silica sol dispersion with an average particle size of 12 mm, 30% by weight of methyl ethyl ketone (MEK), 70% by weight from Nissan Chemical Industries, Ltd.
3. NZ-39, neopentyl (diallyl) oxy triacryl zirconate, from Kenrich Petrochemicals, Inc.

4. Z-6030, 3-methacryloxypropyltrimethoxysilane, was obtained from Dow Corning Corp.
5. Ebecryl® 1290 six-functional aliphatic urethane acrylate oligomer from UCB Chemicals Corp. It was used as a part of base resin.
6. Irgacure® 184 photoinitator-1-hydroxycyclohexyl phenyl ketone from Ciba Speciality Chemicals, Inc.
7. Calcium acrylate dihydrate from Gelest, Inc.
8. 1,6-Hexanediol diacrylate (HDODA) from UCB Chemicals Corp.

These examples are presented merely to demonstrate and not to limit the invention in any manner.

EXAMPLE 1

This example demonstrates a significant effect of ionic compounds in a sol-gel reaction. In the reaction of 40% (by weight) of trifunctional silane with a mono methacrylate organic functional group, i.e. 3-methacryloxypropyltrimethoxysilane, was used in the sol-gel reaction. The silane was first dissolved in methanol. The silane/methanol ratio was about 1/50 by weight. Methanol was used as the reaction solvent and a very low concentration of HCl (0.2 gram of 0.1 N HCl in 100 grams of reactants) was used as the catalyst for both hydrolysis and condensation reaction. The silane was hydrolyzed with the same equivalent number of water at 40° C. The reaction time was 2 hours. The hydrolyzed silane was incorporated with 60% by weight of Ebecryl® 1290. After the sample was mixed very well, methanol was then evaporated under conditions of low pressure of 100 millibar and 40° C. 99.2% of reactive composite liquid was obtained. The fresh produced composition (Comparative Example 1) was a clear and viscous liquid. However, the sample became cloudy 12 hours after the sample was set at room temperature. It indicated either large particle formation or micron-scale phase separation. This is believed to be the results of continued hydrolysis and condensation reactions. Two months later, the liquid gelled.

Another reaction was carried out as a comparison to the one above. All compositions were the same as above except 0.1 gram of calcium diacrylate ionic compound (0.1% by weight based on the total composition weight) was added into the reaction solution before the reaction was started. Again, 99.2% of reactive composite liquid was obtained after evaporation operation under the same conditions described above.

Amounts shown in Table 1 below are in parts by weight

TABLE 1

| Composition | Comparative Example 1 | Example 1 |
|---|---|---|
| 3-Methyacryloxypropyltrimethoxysilane | 41.40 | 41.40 |
| D.I. $H_2O$ | 27.00 | 27.00 |
| HCl | 0.21 | 0.21 |
| Calcium acrylate dihydrate | 0.0 | 0.10 |
| Ebecryl ® 1290 | 62.10 | 62.10 |
| Total | 130.31 | 130.41 |

The produced composition was also a clear and viscous liquid. However, the product remained clear and viscous for six months. This indicates that the condensation of produced silanol was stopped, or at least retarded.

EXAMPLE 2

This example shows preparation of a composition via particle surface modification. Instead of using silane-coupling agents as particle surface modifiers, non-hydrolyzable organic zirconate, NZ-39, i.e. neopentyl (diallyl)oxy triacryl zirconate was employed in this example. This coupling agent provides not only particle surface modification and better compatibility between inorganic and organic phases; it also provides polymerizable/crosslinkable reactivity, preferably, UV curable functionality. The molecular structure of this coupling agent is represented as follows:

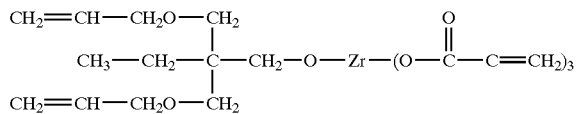

The components of compositions as above, in accordance with the present invention (Examples 2 and 2 A) as well as a control sample (Comparative Example 2) are shown in Table 2.

TABLE 2

| Composition | COMPARATIVE EXAMPLE 2 | Parts | EXAMPLE 2 | Parts | EXAMPLE 2A | Parts |
|---|---|---|---|---|---|---|
| Particles | Absent | 0.0 | $SiO_2$ | 5.5 | $SiO_2$ | 10.0 |
| Surface Modifying Agents | Absent | 0.0 | NZ-39 | 0.05 | NZ-39 | 0.05 |
| Organo-Silane as inorganic network former | Absent | 0.0 | Z-6030 | 0.5 | Z-6030 | 9.02 |
| Adhesion promoter | Absent | 0.0 | Z-6030 | 0.5 | Z-6030 | 1.00 |
| Catalyst | Absent | 0.0 | Acrylic acid | 1.0 | Acrylic acid | 1.06 |
| Ionic Compound | Absent | 0.0 | Calcium diacrylate | 0.05 | Calcium diacrylate | 0.05 |
| D.I. Water | Absent | 0.0 | $H_2O$ | 0.24 | $H_2O$ | 2.21 |
| Organic Base Resins | Ebecryl ® 1290 | 100.0 | Ebecryl ® 1290 | 89.0 | Ebecryl ® 1290 | 80.00 |
| Photoinitiator | Irgacure ® 184 | 4.0 | Irgacure ® 184 | 4.0 | Irgacure ® 184 | 4.0 |
| Total | | 104.0 | | 100.84 | | 107.39 |

The silica dispersion was first mechanically dispersed into methanol by stirring with a magnet bar. The ratio of $SiO_2$ vs. methanol was normally 1/30-1/50. A clear dispersion was obtained. This dispersion was ready for surface modification reaction. NZ-39 was dissolved in methanol to make a 1–5%

(by weight) solution. At room temperature, the solution then was added dropwise into the dispersion under good agitation. The amount of surface modifying agent used in the reaction depends on several parameters. These include the reactivity of the coupling agent, the molecular size of the coupling agent, the type and size of the particles, the surface structure of the particles, as well as the available number of reactive groups on the surface of the particles. In this example, NZ-39, based on the particle (silica in this case) weight, can be varied from 0.1–5.0%. the surface modification reaction normally took place at room temperature. However, in order to ensure completion of the reaction, the mixture should be refluxed at 60° C. for two hours.

After surface modification, the silica dispersion was clear and very stable. There was no precipitation even after it had been sitting at room temperature for at least two months.

After the particle surface modification, it is safe to add a necessary amount of desired organosilanes as precursors of inorganic networks and adhesion promoters. However, before this, addition of a mixture of acid/calcium diacrylate/$H_2O$/alcohol is necessary. The acid is used as the catalyst for both silane hydrolysis and condensation reactions later. The acid can be HCl, acrylic acid or other proper acids. The amount of acid is normally <0.1% of silanes. Calcium diacrylate is used as the gel-inhibitor or viscosity stabilizer. The amount of calcium diacrylate, i.e. as little as 100 ppm, is <1.0% by weight in the total composition. The amount of deionized (D.I.) water should have the same equivalent number as silanes used in the final product. In some cases, the water can be in slight excess. Calcium diacrylate and the acid were dissolved in the D.I. water first, then 50–100 ml of alcohol was used for dilution to make an alcohol solution. The solution was added dropwise under agitation. The organosilanes were also dissolved in methanol to make 1:5–10 solution. The silane solution was also added dropwise into the reactor under agitation. Agitation is continued for ½ hour at room temperature after the addition.

The dispersion was then easily and homogeneously mixed with UV-curable resins. In this example, the hexafunctional aliphatic urethane acrylate, Ebecryl® 1290, was used as the base resin. The composition normally contains 5%–10%, but can be as high as 40% by weight of modified particles based on the total formulation. The solvent, methanol, was evaporated at 40° C. with gradually increased vacuum values from 240 millibar to 50 millibar. Through this "solvent exchange" operation, at least 97%, and more often, 100% of the methanol could be evaporated. Therefore, the composition becomes 100% reactive. More clearly, the compositions contain both organic resins and modified particles, which are reactive, and preferably, UV-curable.

Four parts of photoinitiator (Irgacure® 184 in the present invention), based on the weight of UV-curable materials were homogeneously mixed into the produced composite materials to form the final formulation.

With respect to the produced Examples 2 and 2A, as seen from Table 2, their compositions are almost the same except that the silane concentration in the composition of Example 2 is 1.0% by weight, while it is 10% in Example 2A. However, unlike in neat silane systems, the different silane contents have shown no significant difference in the viscosity between these two materials. More importantly, the viscosity of both materials is fairly stable two months after the materials were produced. The viscosity changes for both materials are in the range of 2%–8% 10 weeks after the materials were produced.

The cured coating film from composition II was further evaluated as shown in Table 3. For comparison, the neat Ebecryl® 1290 was formulated and used as the control sample.

Approximately 0.5–0.6 mil films/coatings were drawn down on Parker Bonderite 40 steel panels and on a LENETA chart for the Taber Abrasion Test. The thickness of coatings/films depend on the number of the drawing bar and the viscosity of the materials. The panels then were cured in air using one or two 300 watt/inch mercury vapor electrodeless lamps, at the maximum belt speed that gave tack-free (cured) films/coatings.

The properties of these films/coatings were then tested according to the methods described above.

Ebecryl® 1290 is UCB Chemical Corporation's hexafunctional aliphatic urethane acrylate oligomer, which provides greater than 9H surface hardness and very good surface scratch resistance. However, it is extremely brittle. The purpose of making this composite is to increase the flexibility without loss of the other advantages of Ebecryl® 1290, such as hardness and scratch resistance.

The performance data of the composite in Table 3 indicates improvements in flexibility reflected in the impact resistance. Adhesion is also increased.

More dramatically, the abrasion resistance of the present composite increases greatly from 100 cycles to greater than 20,000 cycles without failure. At the same time, the advantages of Ebecryl® 1290 remain.

TABLE 3

| Property | Neat UV-Resin Comparative Example 2 | Example 2-Present Invention |
|---|---|---|
| Appearance | Newtonian, viscous liquid, At 60° C. | Viscous liquid Pseudo-plastic at 25° C. |
| UV-Dosage (J/cm$^2$) | 0.6 | 0.6 |
| Surface Pencil Hardness ASTM D3363 | >9 H | >9 H |
| MEK Resistance | >200 | >200 |
| Abrasion Resistance ASTM D4060-84 | 100 cycles failed | 20,000 cycles without failure |
| Scratch Resistance (Steel Wool Double Rubs) | >200 | >200 |
| Impact Resistance ASTM D2794 Lb.-inch | 8 | 16 |
| Adhesion on Steel Panel ASTM D3359-95a | 3B | 4B–5B |
| Conical Blend | 4 inch failed | 4 inch failed |

Table 4 presents more details regarding improvements of abrasion resistance. In addition, the weight lost per abrading cycle for the invented nanocomposite significantly decreases.

TABLE 4

| Sample | ASTM D4060-84 Test results (failed-broken through, weight lost: µg/cycle) Coating thickness: ~0.5 mil. | | | |
|---|---|---|---|---|
| Control Sample Ebecryl ® 1290 | 100 cycles, Failed 66.0 | | | |
| Example 2 | 100 cycles, Passed, 0.0 | 1,000 cycles, Passed, 3.6 | 10,000 cycles, Passed, 2.2 | 20,000 cycles, Passed, 2.0 |

EXAMPLE 3

At times, organic-inorganic compositions prepared for radiation curable applications experience thermal stability problems. Some samples show significantly increased viscosity or even form a gel when aged at elevated temperatures for an extended time (such as a few days). For example, an organic inorganic composition (control) from silica particles and HDODA was placed in a 60° C. oven for three weeks. After that time, its viscosity at 25° C. increased from 18 cP to 420 cP, a 22-fold increase. It gelled after 4 weeks in the 60° C. oven. However, thermal stability is required for commercial organic-inorganic compositions as these products may be stored above room temperature over their shelf life.

The present experiment is intended to stabilize radiation curable organic-inorganic compositions through the addition of a small amount of inorganic salt. The work included the preparation of a composition with the same components as the control (Comparative Example 3), yet stabilized with calcium acrylate (Example 3), and the study of this preparation's thermal stability by monitoring its viscosity change after aging at 60° C. for different lengths of time.

This example shows the preparation of a composite via particle surface modification and the preparation of a composite via particle surface modification stabilized by the addition of an inorganic salt.

The inorganic salt used in the preparation was calcium acrylate dihydrate.

Preparation of Control Composition (Comparative Example 3).

A solution of Z-6030 (0.50 g) in MEK (21.67 g) was slowly added to MEK-ST (50.00 g) stirred with a Teflon magnetic stirbar over 35 minutes. The mixture was refluxed on a rotary evaporator under vacuum (200 mm Hg) at 45° C. for 135 minutes. HDODA (35.00 g) was added to the mixture over 20 minutes with stirring. Then MEK was removed from the resulting mixture by rotary evaporator over a period of 120 minutes at 45° C. No significant amount of solvent could be further removed from the product. The final product contained 95% of solids.

Preparation of Composition of Present Invention (Example 3).

A solution of Z-6030 (0.50 g) in MEK (21.67 g) was slowly added to MEK-ST (50.00 g) stirred with a Teflon magnetic stirbar over 35 minutes. Then a mixture of calcium acrylate (0.0073 g) and water (0.02 g) in isopropanol (IPA) 11.39 g) was slowly added to the stirred reaction mixture over 10 minutes. The mixture was refluxed on a rotary evaporator under vacuum (200 mm Hg) at 45° C. for 135 minutes. HDODA (35.00 g) was added to the mixture over 20 minutes with stirring. Then the volatile solvents were removed from the resulting mixture by rotary evaporator over a period of 120 minutes at 45° C. No significant amount of solvents could be further removed from the product. The final product contained 95% of solids.

Thermal stability tests.

Example 3 and control samples (Comparative Example 3) were transferred to clear glass bottles and were placed in a 60° C. oven. Their viscosity changes were monitored at various tame intervals.

Table 5 lists the viscosity data obtained from the thermal stability tests. It can be seen that the viscosity of Example 3 did not significantly increase, in contrast in the case of the control, which gelled after aging for 4 weeks. The composition of Example 3 is thus regarded as thermally stable at 60° C.

TABLE 5

Viscosity Data from the Thermal Stability Tests of Example 3 and Control

| Aging Time (days at 60° C.) | Viscosity of Comparative Example 3 (cP at 25°) | Viscosity of Example 3 (cP at 25° C.) |
| --- | --- | --- |
| 0 | 18 | 18 |
| 7 | 54 | |
| 8 | | 20 |
| 14 | 199 | 21 |
| 21 | 420 | |
| 28 | (Gelled) | 22 |

Conclusion

This Example demonstrates that radiation curable organic-inorganic composites be stabilized with the addition of inorganic salts. The stabilized materials improved thermal stability at elevated temperature.

We claim:

1. A substantially reactive and gel-free composition which comprises:
   a. particles capable of reaction with a radiation curable resin;
   b. a coupling agent for modification of the surface of said particles;
   c. a radiation curable resin;
   d. a radiation curable salt capable of inhibiting gel formation in said composition.

2. The composition according to claim 1 wherein said particles a are inorganic particles.

3. The composition according to claim 2 wherein said inorganic particles are particles of metals, silicon oxides, metal oxides or aluminosilicates.

4. The composition according to claim 1 wherein said particles are organic particles.

5. The composition according to claim 4 wherein said organic particles are polymer particles.

6. The composition according to claim 5 wherein said polymer particles are polyethylene, polypropylene, polyamide or polyester.

7. The composition according to claim 1 wherein said coupling agent is an organic zirconate, titanate or aluminate or a mono- or multi-functional silane.

8. The composition according to claim 1 wherein the radiation curable resin is a urethane (meth)acrylate, epoxy (meth)acrylate or polyester (meth)acrylate.

9. The composition according to claim 1 wherein the radiation curable salt is a metal (meth)acrylate.

10. The composition according to claim 9 wherein the metal is di or tri-valent.

11. The composition according to claim 1 wherein the particles are present at 1 to 60% by weight, the coupling agent is present at 0.1 to 5% by weight, the radiation curable resin is present at 99 to 40% by weight.

12. The composition according to claim 9 wherein the metal (meth)acrylate salt is calcium di(meth)acrylate, magnesium di(meth)acrylate, zinc di(meth)acrylate or aluminum tri(meth)acrylate.

13. Method for making a composite material which comprises subjecting the composition of claim 1 to UV cure.

14. Method for making an organic/inorganic hybrid composite material which comprises subjecting the composition of claim 2 to UV cure.

15. Method according to claim 14 wherein said inorganic particles are metals, silicon oxides, metal oxides or aluminosilicates.

16. Method according to claim 13 wherein said particles are polymer particles.

17. Composite material produced by the method of claim 13.

* * * * *

UNITED STATES PATENT AND TRADEMARK OFFICE
CERTIFICATE OF CORRECTION

PATENT NO. : 6,838,536 B2
DATED : January 4, 2005
INVENTOR(S) : Zhikai Wang et al.

It is certified that error appears in the above-identified patent and that said Letters Patent is hereby corrected as shown below:

Column 10,
Line 23, should read --
Claim 1. A substantially reactive and gel-free composition which comprises:
    a. particles capable of reaction with a radiation curable resin;
    b. a coupling agent for modification of the surface of said particles;
    c. a radiation curable resin;
    d. a radiation curable salt capable of inhibiting gel formation in said composition, <u>in an amount less than 1% by weight of the total weight of the composition.</u> --

Signed and Sealed this

Twelfth Day of April, 2005

JON W. DUDAS
*Director of the United States Patent and Trademark Office*